(12) United States Patent
Emmerich et al.

(10) Patent No.: US 6,234,555 B1
(45) Date of Patent: *May 22, 2001

(54) CLOSURE APPARATUS FOR MOTOR VEHICLE FUEL TANKS

(75) Inventors: Ulf Emmerich, Weissenburg; Thaddäus Buratowski, Langenaltheim, both of (DE)

(73) Assignee: Alfmeier Prazision AG Baugruppen und Systemlosungen, Treuchtlingen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,223

(22) Filed: Jul. 23, 1998

(30) Foreign Application Priority Data

Jul. 25, 1997 (DE) .............................. 197 32 072

(51) Int. Cl.[7] .................................. B65D 45/00
(52) U.S. Cl. ............. 296/97.22; 220/86.2; 220/DIG. 33
(58) Field of Search ........................ 296/97.22; 220/86.2, 220/DIG. 33; 292/201, 144

(56) References Cited

U.S. PATENT DOCUMENTS

| 3,750,825 | * | 8/1973 | Bachle . |
| 4,376,492 | * | 3/1983 | Bartel . |
| 4,418,553 | * | 12/1983 | Applegate ............................. 70/164 |
| 4,795,050 | * | 1/1989 | Smith et al. . |
| 5,072,986 | * | 12/1991 | Tai et al. . |
| 5,235,122 | * | 8/1993 | Cherny . |
| 5,253,920 | * | 10/1993 | Eldridge . |
| 5,437,317 | * | 8/1995 | Takatsuka et al. . |
| 5,524,786 | * | 6/1996 | Skudlarek . |
| 5,615,793 | * | 4/1997 | Muller . |
| 5,715,963 | * | 2/1998 | Boll et al. . |
| 5,845,800 | * | 12/1998 | Shaw et al. . |

* cited by examiner

Primary Examiner—Joseph D. Pape
(74) Attorney, Agent, or Firm—Dority & Manning, P.A.

(57) ABSTRACT

The invention concerns a closing and opening apparatus for the filling opening of the tank of a motor vehicle. This includes a drive element for the opening and closing of a tank cap (3) functioning in conjunction with a filling opening (2) of a motor vehicle, a lever drive follower for the drive element and a control apparatus (100) with which the drive element is controllable from the interior of the motor vehicle space, especially from the driver's seat.

20 Claims, 6 Drawing Sheets

CLOSURE APPARATUS FOR MOTOR VEHICLE FUEL TANKS

BACKGROUND OF THE INVENTION

The invention concerns a closure apparatus for motor vehicle fuel tanks.

Normally, such an apparatus encompasses a tank cap, which is generally secured in the manner of a bayonet connection on the filling opening of the tank intake pipe. The filling hole as well as the tank cap are placed in a compartmentalized, lidded compartment of the vehicle body, here called the "recess". A disadvantage of the conventional arrangement is the necessity of manually opening and closing the tank cap upon filling. In particular, with diesel fuels, the tank cap is often dirtied, so that only by the use of gloves can a soiling of the hands be avoided. Further, the possibility exists that a tank cap is not correctly restored on the filling pipe and consequently the smell of fuel enters the vehicle interior. Also, an incorrectly replaced cap can be lost during travel. Finally, after tanking up, a cap can be left behind at a filling station. If this occurs, then liquid fuel can splash out of the filling pipe.

OBJECTIVES AND SUMMARY OF THE INVENTION

In regard to the above, it is the purpose of the invention to propose a closure apparatus, which is improved in this respect.

This purpose can be achieved by means of a closing apparatus bearing the features of the present invention. This apparatus embraces a drive element for the automatic opening and closing of the of the tank cap, a transmission rod of said drive element and a control arrangement by which the drive is controllable from within the vehicle interior, preferably from the driver's seat. With such a closure apparatus, the disadvantages enumerated in the above introduction are fully avoided. The only required manual activity upon tanking, is to place the feed nozzle in the filling hole and at the end of the operation to remove same and hang it properly on its support. The opening and the closing of the tank cap is done very simply by a push button or a switch (etc.) placed in the vehicle interior.

The closing of the tank cap can even be accomplished by a logical recognition system. It is further conceivable that when the tank cap is open, turning on the ignition activates a closing action.

In vehicles, many times, a pneumatic or hydraulic onboard network is available. If this is the case, it is then practical to employ a correspondingly activated drive. However, even in vehicles which possess no such onboard utility, hydraulic or pneumatic energy can be easily produced by a compressor or a hydraulic pump. Obviously, an electrical element can also be used. Preferably, pneumatic drive elements are installed, since they are more simply built, lighter and more environmentally friendly. Particularly advantageous is the installation of a double action pneumatic diaphragm cylinder. As a source of pressure, atmospheric pressure will serve, as the diaphragm cylinder is suction activated. The source of the suction is the low pressure generated in the intake manifold of the motor.

Another advantageous embodiment is the provision of a pneumatic or hydraulic hand-pump, which connects to the drive element and loads this in the direction of the opening position. In the case of failure of the control device, the tank cap can be opened by hand. In the case of yet another advantageous embodiment, the opening and closing movement of the tank cap is mechanically coupled with the opening and closing motion of the lid of the tank recess. In this way, with a single operation, both the tank recess lid and the tank cap are opened and closed.

For the opening and closing mechanism, there are a great number of different possibilities available. An arrangement easy to construct and reliable in operation is comprised in that the tank cap is pivotably affixed to an axle, which axle is radially displaced from the cap, but running parallel to the surface plane thereof. The cap then, with a simply designed lever arrangement, or the like, can be opened and shut with the help of a drive. In a more practical way, the pivot axle lies with its ends in first pivot eyes in two retaining lugs set on the outer periphery of the tank cap, the plane surfaces of which lugs run parallel to one another and also parallel to an imaginary diameter line of the tank cap.

The section of the pivot axle which extends between the retaining lugs, penetratingly enters the free ends of two band like carriers embracingly affixed to the outer circumferential surface of the filling pipe, which carriers proceed therefrom on a slant. For its swinging motion, the tank cap possesses a positioning axle which runs parallel to the first pivot axle and the ends of which lie respectively within second pivot eyes in the retaining lugs. On the positioning axle is connected a drive rod of the drive element, preferably being the piston rod of a pneumatic diaphragm cylinder. The two pivot eyes of the retaining lugs are so positioned, that their connection line with a defined plane of the tank top closes an acute angle opening away from the drive rod. By means of this arrangement, there arises a two armed angular, pivotable lever about the pivoting axle. Advantageously, between the drive rod and a position axle, a swinging arm is interposed, which, with its end proximal to the drive, is linkedly connected with the drive rod. Through this design, it is assured that the drive rod carries out only a translation movement. Thereby a possibly required radius linking of the drive rod as well as the securement of drive element on the vehicle body is simplified.

For the locking of the tank cap a locking slider is provided, which is run on the upper side of the tank cap between a released and a locked position. The one end of the locking slider is connected with the position axle, while the other end in the locked position penetrates a wall cutout, the wall radially offset from the tank cap.

The position axle is placed in the second pivot eye of the retaining lugs, which eyes are designed as elongated ovals and which extend parallel to the movement direction of the locking slider. By means of this construction, assurance is given that the drive axle first pulls the locking slider out of its lock position into its release position and only then permits the tank cap to be swung away from the filling pipe. In a particularly advantageous arrangement, the tank cap is, essentially, a pot shaped housing, in which is placed an axially movable gasketing piece matching the opening circumferential rim of the filling pipe. The gasketing piece penetrates the housing upper side with at least two pressure clamps.

The pressure clamps laterally flank the locking slider and act together with it in the manner of a inclined drive in such a way that the gasketing element in the locked position of the tank cap is pressed against the circumferential rim of the filling pipe. This arrangement assures that the tank cap is continually hermetically, tightly seated on the rim of the filling pipe.

The motion transmitting coupling between the tank cap and the tank recess lid is accomplished, in a preferred design, in that the translation movement of the drive rod is transmitted by means of a connection bar to a two armed lever affixed to the inside of the tank lid.

Additional objects, advantages, and features of the invention may be learned from practice of the invention as set forth in the following description, with reference to the attached drawings.

BRIEF DESCRIPTION OF THE DRAWINGS

The invention will now be described more closely, with the aid of the enclosed drawings of a designed embodiment example. There is shown in.

DESCRIPTION OF THE PREFERRED EMBODIMENTS

Figure 1:
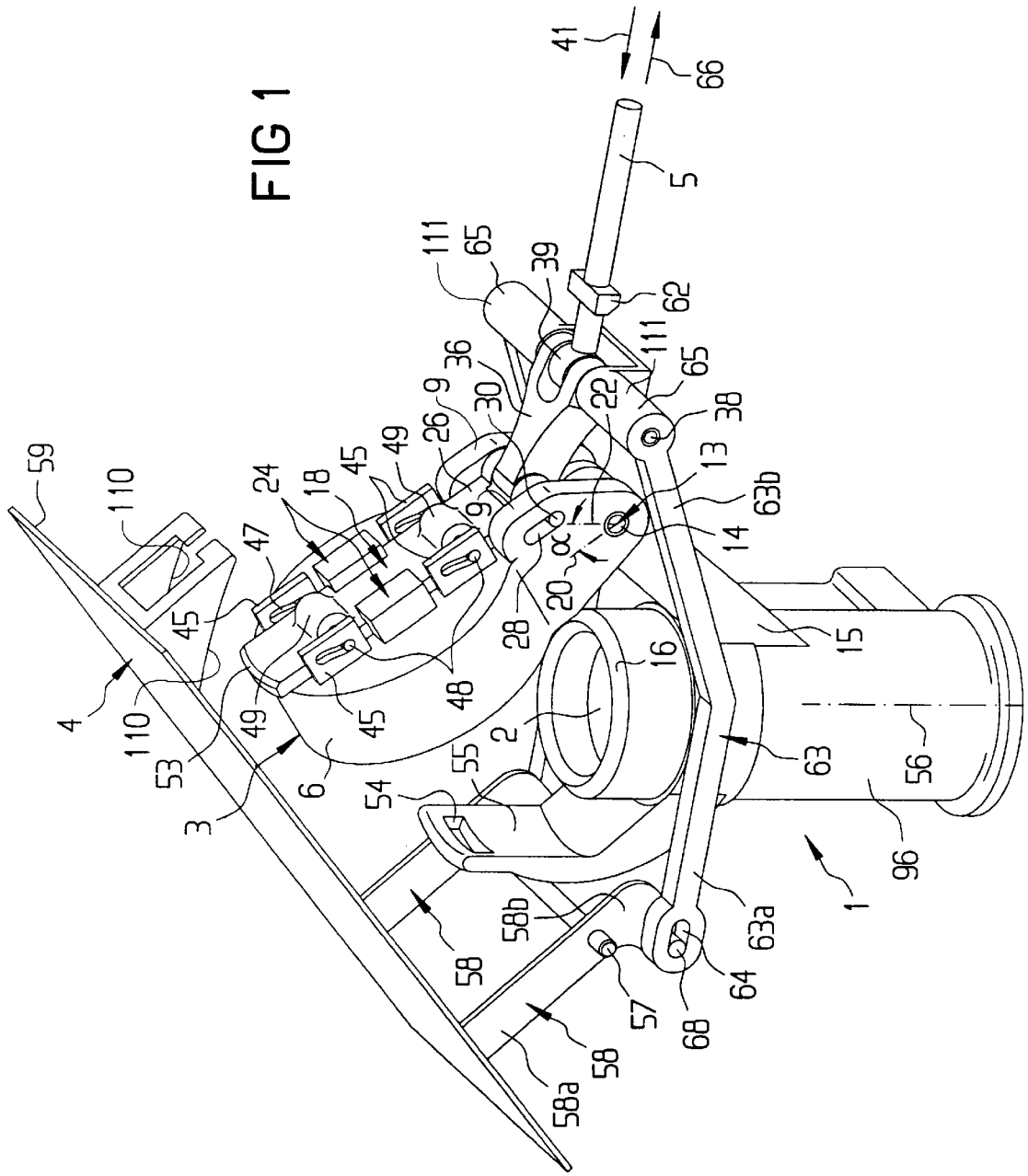
FIG. 1 a perspective view of a closure apparatus in accord with the present invention, FIG. 2 a longitudinal section view taken along Section Line II—II as shown in FIG. 1, FIG. 3 a plan view in the direction of arrow III in FIG. 2 with a closed tank cap and closed tank recess lid, FIG. 4 a diagrammatic view of a pneumatic diaphragm cylinder with emergency activation, FIG. 5 a diagrammatic view of a pneumatic diaphragm cylinder with alternate emergency operation, FIG. 6 a functional schematic illustration, which shows a closure apparatus in accord with the invention in a controllable situation and FIG. 7 a partial section view showing detail VII from FIG. 2.

Reference will now be made in detail to the presently preferred embodiments of the present invention, one or more examples of which are illustrated in the drawings. Each example is provided by way of explanation of the invention, and not meant as a limitation of the invention. For example, features illustrated or described as part of one embodiment may be used with another embodiment to yield yet another embodiment. It is intended that the present invention include such modifications and variations.

In FIG. 1, for reasons of quick comprehension and clarity, only the mechanical components of a closure apparatus are presented, namely, the upper end of a filling pipe 1 with a filling opening 2, a tank cap 3, the lid 4 of the tank recess on the vehicle body, and a drive rod 5. The drive rod 5 acts upon a lever connection, which functions with tank cap 3. The lever drive is more closely described below.

The tank cap 3 is essentially an assembly of a generally pot shaped cap housing 6 together with a gasketing piece 7. At the outer circumferential edge of the cap housing 6 are two retaining lugs 9 which are integral with said housing 6. These retaining lugs are spaced apart and arranged parallel to one another. The face planes of these lugs 9 run parallel to the centerline 8 of the cap 3 as well as the centerline 10 of the cap 3 and are situated with both centerlines between them.

In the outwardly lying area of the lugs 9, radially remote from the cap 3, are placed first pivot eyes 13. These pivot eyes 13 are bearings for a pivot axle 14, which lies therein inclusive of its ends. This pivot axle 14 is affixed by means of its section located between the retaining lugs 9, and pivotally holds two of the carriers 15 which extend slantingly upward from the outer circumferential surface of the filling pipe 1, the carriers each being somewhat quadrilateral in cross-section. The tank cap 3 is thus pivotable on these carriers 15, in other words, swingably borne on the filling pipe 1. The pivot axle 14 exhibits a radial spatial offset from the tank cap 3 and runs parallel to the plane 20 thereof, which is to say, parallel to the extended plane 21 of the opening rim 16 of the filling pipe 1. Otherwise, the pivot axle 14 is axially at a right angle to the imaginary diametrical centerline 10 of the tank cap 3.

On the upper side 17 of the cap housing 6 is a locking slider 18 which is guided to slip in the direction of the diametric centerline 10. The centerline 10 forms in this way the travel path 19 of the locking slider 18. At the same time, it defines the travel path of a drive rod 5 which activates the opening and closing of the tank cap 3. The drive rod 5 is connected to the piston of a pneumatic cylinder 23 (see FIGS. 4–6).

The locking slider 18 is a flat part, plate shaped and quadrilateral in cross section. It lies with its flat side on the upper surface 17 of the cap housing 6. This slider 18 is guided along its sides and in the direction shown by the centerline 10 of the tank cap 3. The guidance is carried out with the aid of two flanking guide projections 24. The guide projections 24 are essentially structural angles, of which one leg 25a stands up somewhat at right angles from the tank cap upper surface 17 and the other leg 25b runs parallel to the face plane of the locking slider 18 and extends itself over the upper side 26 of the slider 18 which said side is remote from the cap housing 6.

On its end proximal to the drive rod 5, the locking slider 18 possesses two guide pins 27 laterally offset from the slide, each of which are respectively inserted in a second set of pivot eyes 28 which penetrate the retaining lugs 9. The pivot eyes of the second set are designed as elliptically long openings 28, which run parallel to the movement direction 19, that is, parallel to a horizontal plane 20 of the tank cap 3. The imaginary connection line 22 between the first pivot eye 13 and and end of the second elliptical pivot eye 28 in a retaining lug 9, closes an acute angle a with the plane 20 of the tank cap 3. The guide pins 27 and the locking slider 18 are slidable in the travel direction 19 over a spatial interval stretch 29, which stretch is made up of the difference between the length of the elliptical openings 28 and the diameter of guide pins 27.

The guide pins 27 are formed from the protruding ends of a position axle 30 which is at right angles to the locking slider 18. From the front side 33 of the locking slider 18 facing the drive rod 5, extends a recess 34. In this recess 34 is found the one end of a pivot arm 36 which is penetrated by the positioning axle 30. The other end, proximal to the drive rod 5, is somewhat U-shaped, wherein the two U-legs 37 are penetrated by a pivot axle 38. The pivot axle 38 runs parallel to the positioning axle 30. In the intervening space existing between the U-legs 37 the drive rod 5 extends with a pivot eye 39. The pivot eye 39 is penetrated by the axle 38.

The cap housing 6 encompasses a base plate 40, on the sides of which plate an apron 43 is integrated, this projecting downward at about a ninety degree angle. Within the apron 43, the gasketing part 7 is placed movable on centerline 8.

Figure 7:
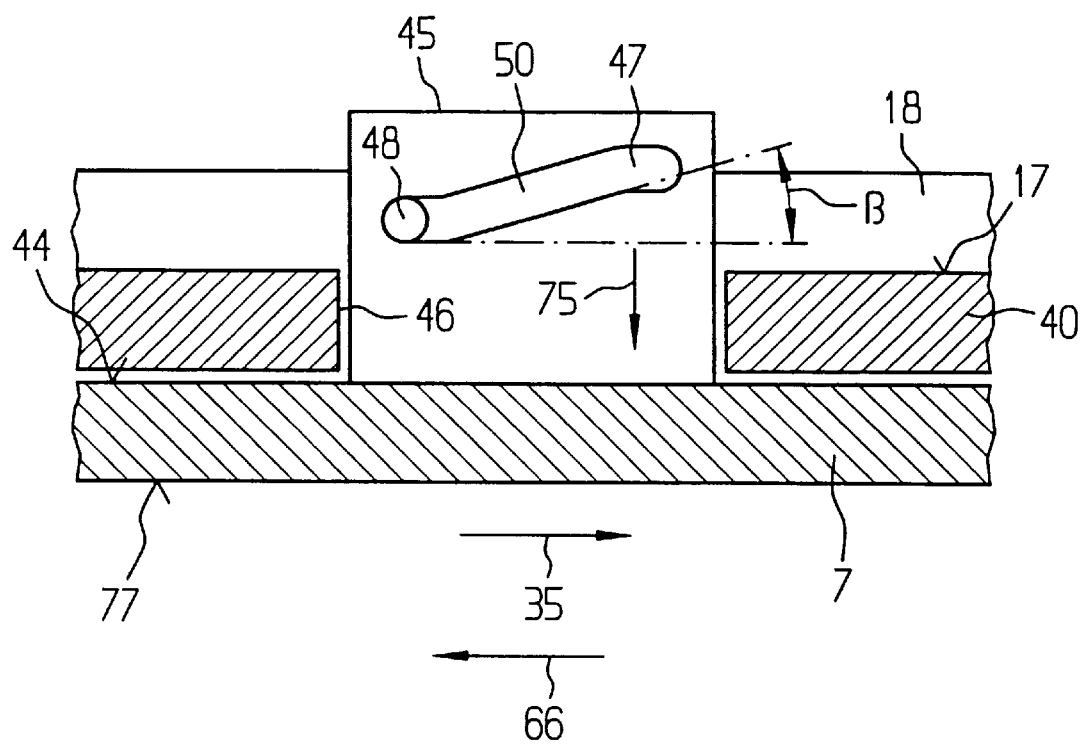

From the upper side 44 of this gasketing part 7 stand, more or less again at right angles, a total of four pressure latches 45, which clampingly reach through the correspondingly dimensioned openings 46 in the base plate 40. The pressure latches 45 are essentially bar shaped components, which, with their flat sides turned to one another, assure an additional guidance for the locking slider 18. The pressure latches 45 are placed, pairwise, opposite one another and are penetrated by the elongated slots 47 which extend essentially in movement direction 19. Into these elongated holes are inserted guide pins 48 which protrude from the sides of two supporting protrusions 49. These protrusions 49 are spatially separated in the movement direction 19 and protrude out of the upper surface 26 of the locking slider 18. The mid-section 50 of the elongated slots 47 runs upwardly in an inclined manner in the locking direction 35, as is especially visible in FIG. 7. This mid-section 50 forms with the locking direction 35 an acute angle β, opening in the same direction.

The end 53 of the locking slider 18, remote from the drive rod 5, penetrates, in the locked position, into a through opening 54 in a wall 55. The wall 55 is affixed on the outer circumferential surface of the filling pipe 1 and is spaced when the cap housing 6 is in the closed position a radial distance from the outer circumferential surface of the cap housing 6, which is to say, the apron 43. As seen in the direction of the center longitudinal axis 56 of the filling pipe, the wall 55 extends upwardly from the plane 21 of the opening rim 16 of the filling pipe 1.

Figure 3:
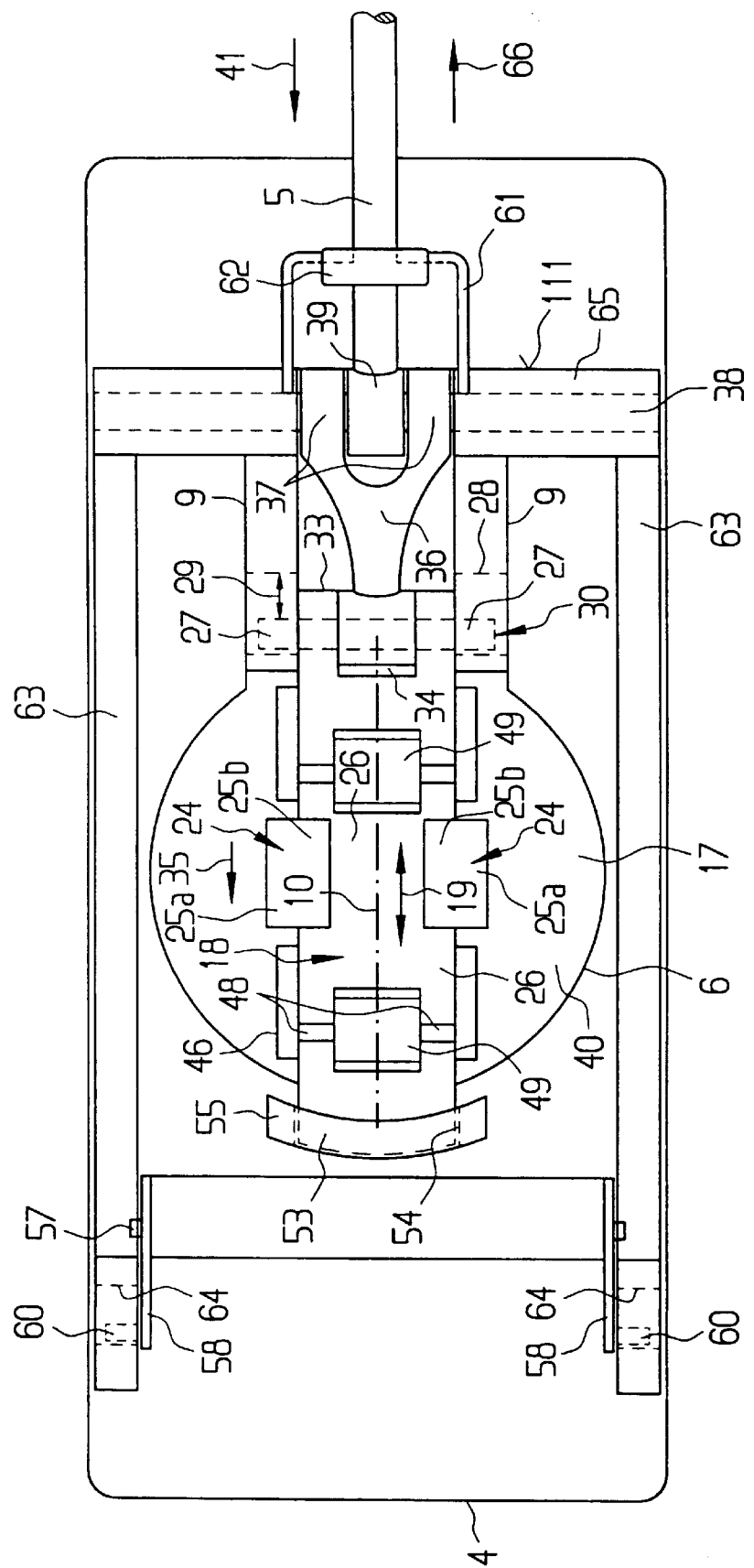

The tank recess lid 4, which, in FIG. 3, is made transparent for illustrative purposes, is swingably fixed in position in a way and manner not further described here, by means of a pivot axle 57 on the body of a vehicle (not shown). This pivot axle 57 runs parallel the other axles, for instance, parallel to pivot axle 38.

Figure 2:
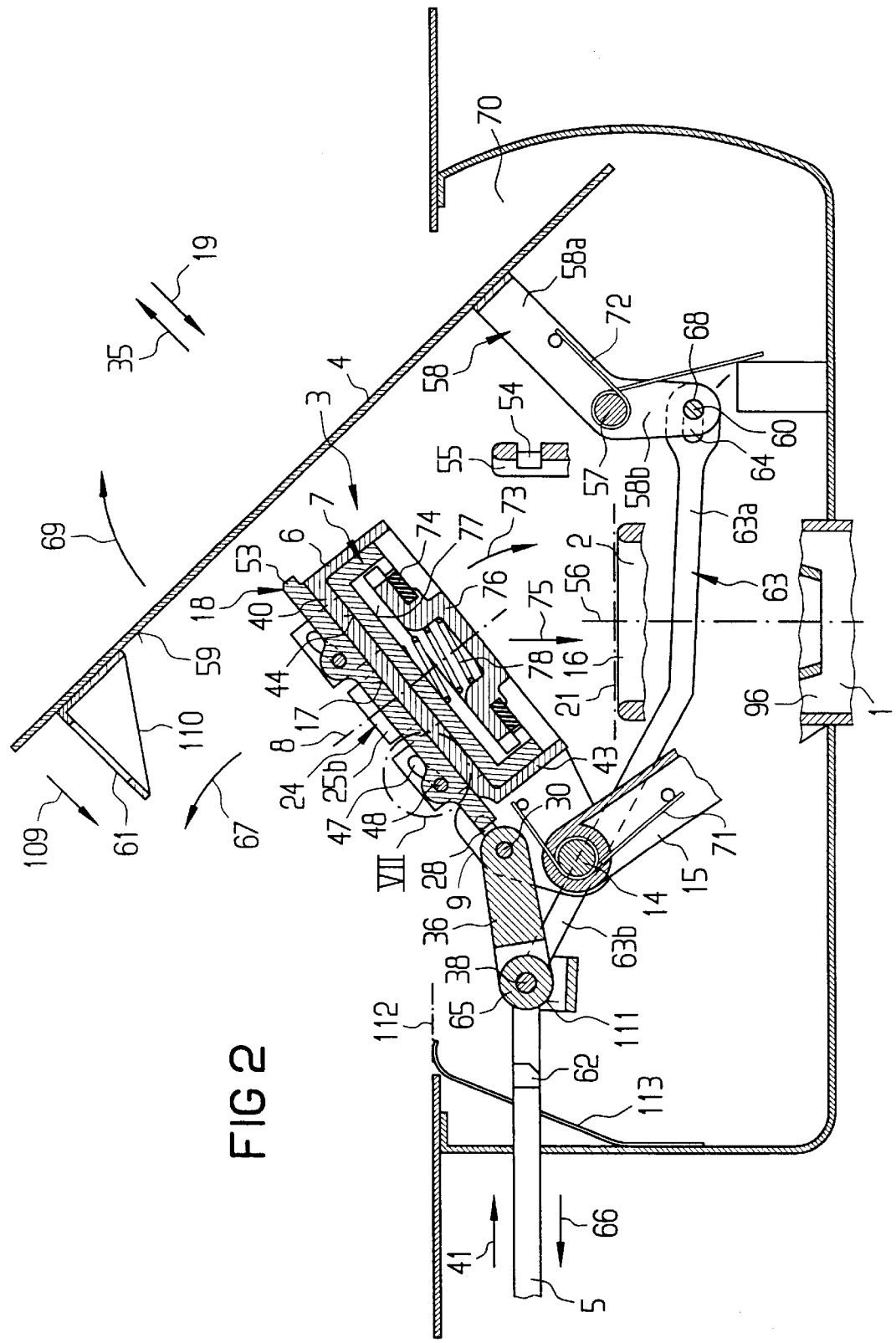

The pivot axle 57 penetrates two respective pivot arms 58, which form a double-armed lever. The pivot axle 57 is so positioned, that it subdivides each of the pivot arms 58, respectively in a longer section 58a and a shorter section 58b. The free end of the longer section 58a is connected with the under, that is, the inner side 59, of the tank recess lid 4. At the free end of the shorter section 58b, a coupling pin 60 is arranged which essentially protrudes at a right angle from the outer sides of the pivot arms 58, which arms are oppositely aligned to one another. The coupling pins 60 swingably penetrate respectively elongated slots 64 at the ends of connection rods 63, which skirt around each side of the filling pipe 4 at a radial offset Each other end of the connection rods 63 is designed as an axially extended pivot eye 65. The pivot eyes 65 of the connection rods 63 are penetrated through by the pivot axle 38 which protrudes laterally out of the U-legs 37 of the pivot arms 36. The connection rod 63 is angled, whereby a first section 63a extends away from the coupling pin 60 somewhat in the movement direction 19 and then joins the upwardly inclining second section 63b as is shown in the side view of FIG. 2.

If, starting from the situation shown in FIG. 3, the drive rod 5, activated by a drive element further described below, is moved in an opening direction 66, at first, only the locking slider 18 is moved. This will be moved along the slide stretch 29. At the end of this movement, the guide pins 27, i.e. the position axle 30, lie on the drive side ends of the elongated slots, and the locking end 53 of the locking slider 18 finds itself outside of the through opening 54. From this point, the linear movement of the drive rod 5 is transformed by the lever combination formed from the pivot arm 36 of the pivot axle 38, the position axle 30, the pivot axle 14 and the retaining lugs 9, into a pivoting action of the tank cap 3, whereby this is pulled in the direction of the arrow 67 away from the filling opening 2 of the filling pipe 1.

In the beginning phase of the drive rod 5 motion, in which the locking slider 18 is moved into its releasing position, and in which the release direction 66 runs essentially parallel to path 19 of the locking slider 18, the tank recess lid 4 remains at first stationary.

Only when the coupling pin 60 strikes the end 68 of the slot 64 remote from the drive rod 5, is the tank recess lid swung in the direction of the arrow 69. Previously, or at the start of the movement of the drive rod 5 in the opening direction 66, the tank recess lid 4 is locked, because a clamplike locking part 61 on the inner side 59 of the lid 4 lockingly engages behind a head shaped widening 62 on the drive rod 5. If the drive rod 5 has completed its maximum stroke travel, then the tank cap 3 and the tank recess lid 4 are swung so far out of the tank recess of the vehicle, that the filling opening 2 is easily accessible for the insertion of a fuel nozzle. After the completion of the fueling operation, the drive rod 5 moves in the closing direction 41. When this is begun, the connection rod 63 first makes a dead run because of its slot 64. On the contrary, the tank cap swings immediately in the direction of the arrow 73.

In the open position of the tank cap 3, no force component acts in the locking direction 35 on the locking slider 18, namely because of the angular situation between the slots 28 and the closing direction 41. On this account, the tank cap 3 is at first pivoted as far downward as its gasketing part 7 can go, that is, the gasketing element 74 located on the underside of the cap 3 now lies on the rim 16 of the filling opening 2. Only then is the locking slider 18 pushed in the locking direction 35 over the sliding stretch 29. This locking slider 18 now engages at the end of this travel with its locking end penetrating the opening 54 of the wall 55. The closing motion of the tank cap 3 is supported by a torsion spring 71 which is located on the free end of the carrier 15 which is penetrated by the pivot axle 14. The closure movement of the tank recess lid 4 is similarly supported by another torsion spring 72 on the pivot arm 58. This brings about the result that the force components of the drive force provided by the rod 5 and acting in the locking direction 35 will always be less than the force necessary for the pushing of the locking slider 18.

During the sliding motion of the locking slider 18 in the closing direction 41, the pressure clamps 49 are moved by the guiding pins 48 in the direction of the arrow 75 to make use of the inclined run of the midsection of the slots 47. The result of this is that the gasketing element 74 is pressed against the rim 16 of the filling opening 2.

The gasketing element 74 possesses an annular disk shape and is held by a central retainer or carrier 76 which is movable within the gasketing part 7 in the direction of the central longitudinal axis 8. Between the carrier 76 and the underside 77 of the gasketing part 7, a compression spring 78, under stress, is inserted. By means of this arrangement, manufacturing tolerances were compensated for and assurance given that the gasketing element 74 is pressed with essentially continuously equalized pressure on the rim 16 of the fuel pipe opening 2.

Figure 4:
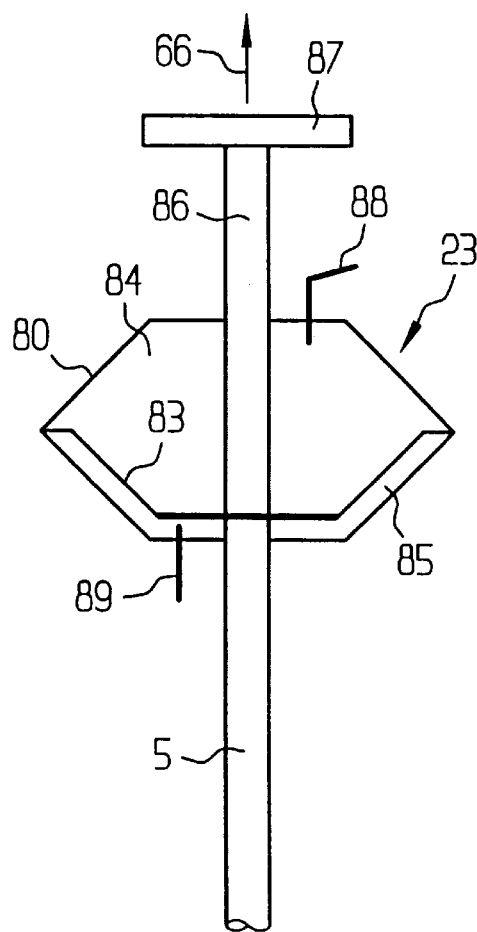
Figure 5:
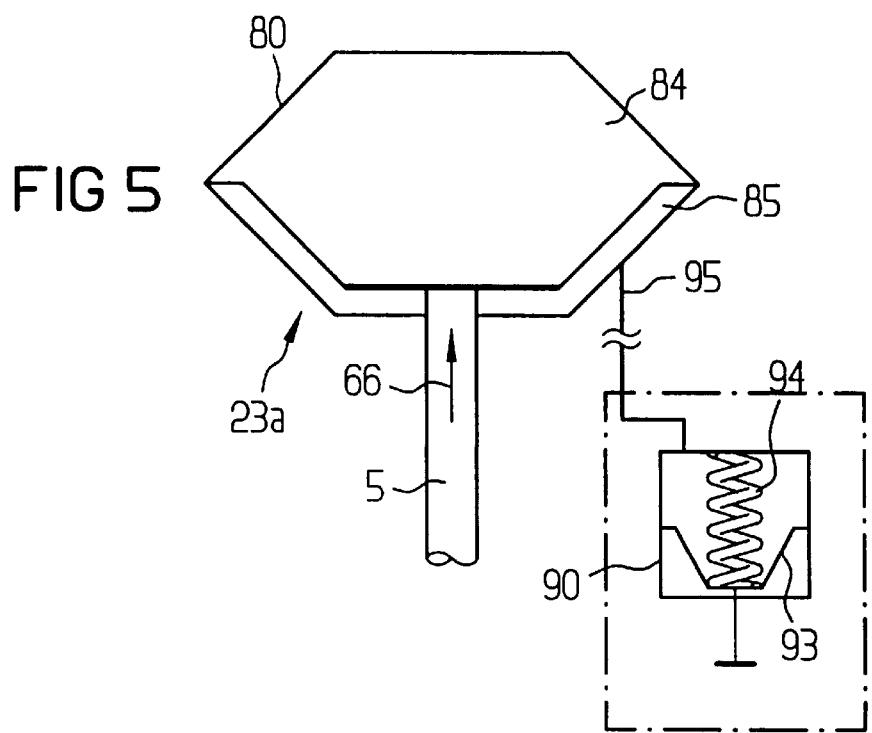

FIGS. 4 and 5 show a drive element designed as a pneumatic diaphragm cylinder 23 and 23a, respectively. The diaphragm cylinder 23 possesses a housing 80 which is subdivided by a diaphragm 83 into a first cylinder space 84 and a second cylinder space 85. On the diaphragm side proximal to the second cylinder space 85, the drive rod 5 is installed and penetrates through the housing 80. On the diaphragm side facing the first valve space 84 there is an activating rod 86 installed, which likewise passes through the housing 80.

On the free end of the activation rod 86 is affixed a hand grip 87, i.e. a holding plate or the like. The activation rod 86 serves the purpose that in case of a system breakdown of the on-board electrical circuit, an opening of the tank cap 3 and the recess lid 4 can be effected. In such a case, the activation rod 86 is moved in the release direction 66. The cylinder spaces 84 and 85 can be subjected to pressure/suction by the tubing connections 88, 89. It is also conceivable, that only one connection, for instance the fitting 88, need be provided by means of which the first cylinder space 84—according to the direction of travel the drive rod 5 is desired to take—can be alternatingly subjected to pressure at one given time and to suction at another given time.

In the presentation of FIG. 5, showing diaphragm cylinder 23a, only the drive rod 5 is shown, the actuation rod is omitted. Emergency activation in this case would be by a pneumatic pump, i.e. an air pump. This illustration further depicts a diaphragm pump 90, the diaphragm 93 of which is loaded by a compression spring 94 in the suction direction. The diaphragm pump 90 delivers air to the cylinder space 85 of the diaphragm cylinder 23a. In that space 85, a high pressure is built up relative to the first cylinder space 84, whereby the drive rod 5 is moved in release direction 66.

Figure 6:
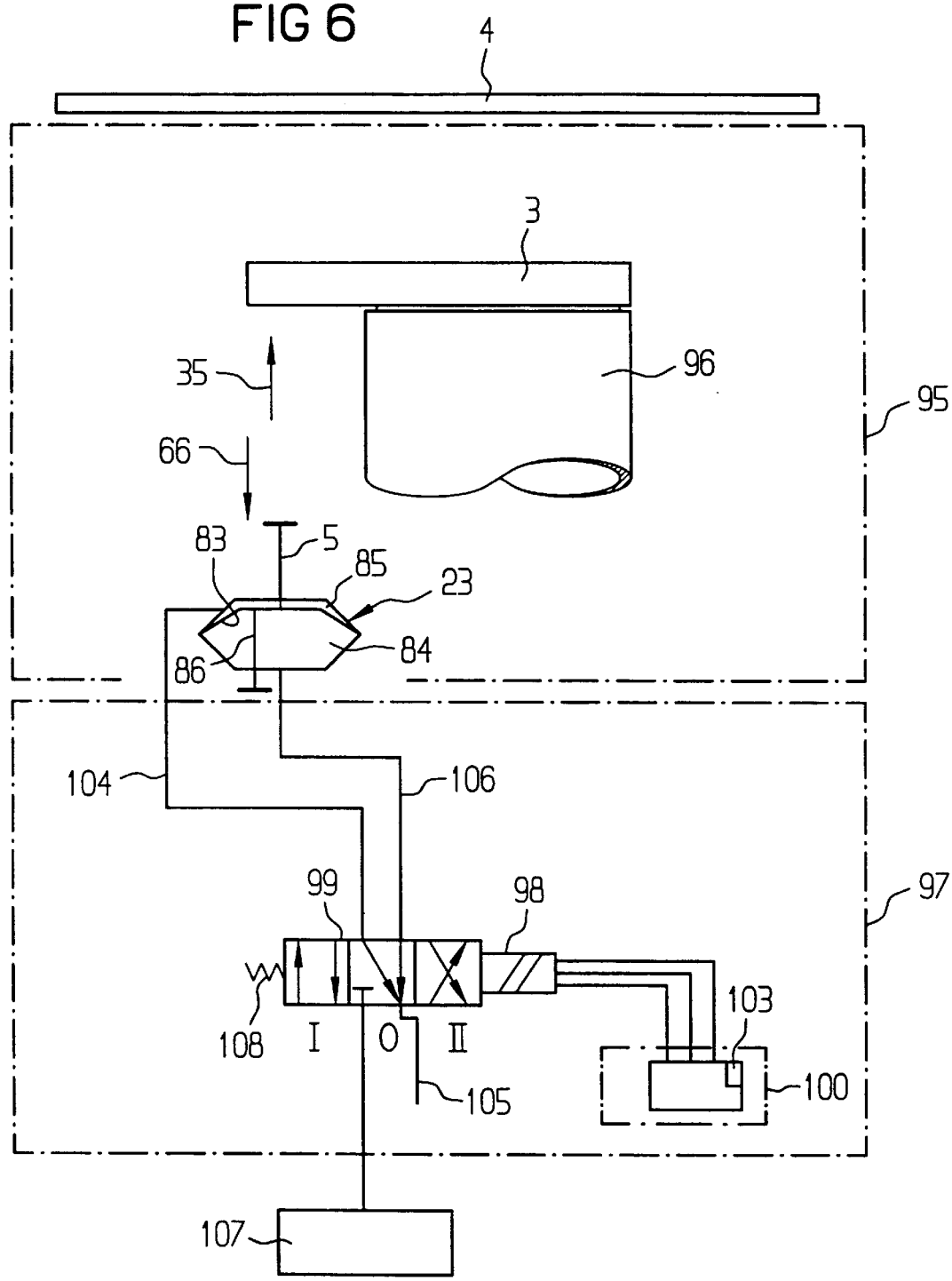

FIG. 6 shows in a very simplified manner, the interaction between the mechanical and control technology of the closing/opening device in accord with the invention. The upper section of the filling pipe 1, the tank cap 3 and the tank recess lid 4, along with the interconnected components thereof which enable control/mechanical coactivity, all form together a subassembly type operating group 95.

The upper section of the filling pipe 1 is, of itself, a separate fitting 96, (see also FIGS. 1, 2) but concentrically connectable with said filling pipe 1. The control of the operating group 95 is accomplished by control group 97. This includes a 4/3 way valve 99 activated by an electro-magnet 98 and a control apparatus 100 preferably installed in the interior space of the vehicle.

The control apparatus 100 is comprised of a switch 103 responding to a push button, with which a signal for the activation of the electromagnet 98 can be released. When the electromagnet is so energized, it moves the valve 99 into valve position II. In this position, the second space 85 of the diaphragm cylinder 23 is connected by line 104 through valve 99 to vent 105 to the atmosphere. The first cylinder space 84 is connected by line 106 with the suction pipe 107 of the vehicle motor (not shown). The atmospheric pressure moves the diaphragm 83 and with it the drive rod 5 in the release direction 66. The cap 3 and the tank recess lid 4 are then opened.

On the diaphragm cylinder 23 is an emergency activation in accord with FIG. 4, that is, an emergency push rod 86 is available. The emergency activation, however, can be formulated in accord with FIG. 5. For the closing of the tank cap 3 and the recess lid 4, the valve 99 is controlled either by the switch 103 or by a logic circuit and moved into its valve position I. In this position, the second cylinder space 85 is exposed to suction, whereby the diaphragm 83 is moved in the locking direction 35. In the middle position "O" both cylinder spaces 84, 85 are vented to the atmosphere and the same pressure exists on both sides of the diaphragm 83. Thus, as a result, no force is exerted on the drive rod 5. This valve position is automatically attained at the end of the closure as well as at the end of the opening procedures.

If, when the tank cap 3 is open, there is a failure of the on-board electrical circuit, the tank cap 3 can nevertheless still be closed, in that the recess lid 4 can be closed manually. Upon such failure, the valve 99 is moved by a restoring spring 108 into the valve position I. In this position, the first cylinder space 84 is vented to the atmosphere through the line 106. The drive rod 5 can, therefore, without building a back pressure, be moved in the release direction 66. Likewise, in the second cylinder space 85, atmospheric pressure is also found when refueling is in progress.

The above described switching and connection logic can be so configured that upon situation when tank cap 3 is open, a closure procedure could be set in motion as soon as he motor is started.

In order to enable the above mentioned closure of the recess lid 4 by hand, generally the drive rod 5 can be moved in an opening direction without overcoming a greater opposing force. In the case of a pneumatic drive element, this is possible in the above described manner and method.

However, where an electrical drive element is concerned, the connection between the drive rod 5 and the electric motor, or, in some cases, between the electric motor and a gear drive interposed between the motor and drive rod 5, must be of such a design that the drive rod 5 is movable in the opening direction 66. Upon closure of the recess lid 4 and the tank cap 3 by hand, then also the locking slider 18 must again be brought into its locking position, in which its locking end 53 penetrates the opening 54. If the tank recess lid 4 moves in the direction of the arrow 109, this movement is picked up by the connection rod 63 and the pivot axle 38 and transmitted to the drive rod 5. This drive rod 5 then moves accordingly in the closure direction 41 and the tank cap 3 swings in the direction of the arrow 73 into its closed position. In order to be able to impel the locking slider 18 into its locking position, the locking part 61 possesses in the direction of the pivot axle 38 a series of triangular key surfaces 10 which work together in a splined manner with the circumferential surface 111 of the axially broadened pivot eye 65.

Towards the end of the movement of the recess lid 4 in the direction of the arrow 109, the triangular key surfaces 110 impact on the pivot eyes 65. The recess lid 4 is then again moved in the direction of the arrow 109. When this occurs, the drive rod 5 is moved in the closing direction 41. Thus, the locking slider 18 moves in the locking direction. In order to make possible a complete locking of the tank cap 3, then the recess lid 4 must be pushed into the tank recess 70 beyond its final end position as shown by the dotted line 112 in FIG. 2. The pivot eyes 65 are thus moved into a closing position by the triangular key surfaces 110 and the tank cap 3 is locked. After the release of the recess lid 4, this lid moves back to its end position in accord with dotted line 112 by actuation of a spring 113 anchored to the inner wall of the tank recess 70.

It will be apparent to those skilled in the art that various modifications and variations can be made in the present invention without departing from the scope and spirit of the invention. It is intended that the present invention include such modifications and variations as come within the scope of the appended claims and their equivalents.

What is claimed is:

1. A closing apparatus for a filling opening of a filling pipe for a motor vehicle fuel tank, the closing apparatus comprising:

a tank cap operatively secured to the filing pipe so as to be movable between an opened position in which the filling opening is opened and a closed position in which the filling opening is closed;

a drive element for moving a tank cap between the opened position and the closed position;

a lever drive operatively connected to the drive element;

a control device for remotely controlling the drive element; and a lock member having a first end and a second end the locking member being slidably mounted on a top surface of the tank cap, slidable between a release position and a locking position, the lock member being operatively connected on the first end to the lever drive, said lock member, when in its locking position, sealing the tank cap on the filling pipe.

2. A closing apparatus in accord with claim 1, wherein, when the lock member is in its locking position, the second end is engaged in a slot in a wall having a radial offset from the tank cap, and when the lock member is in its release position the second end is free from the slot.

3. A closing apparatus in accord with claim 2, wherein the slot is formed from a radially penetrative opening of the wall, wherein the wall is stretch fitted onto an external circumferential surface of the filling pipe and extends axially beyond a rim of the filling pipe.

4. A closing apparatus in accord with claim 1, wherein the tank cap is swivably mounted on a pivot axle spaced from the tank cap but extending parallel to the top surface of the tank cap and to a plane which extends outwardly from a rim of the filling pipe.

5. A closing apparatus in accord with claim 4, wherein the pivot axle has two ends which are set in bearings in a first set of pivot eyes disposed within retaining lugs integral with a surface of the cap, further including guide projections disposed across the top surface of the tank cap so as to extend parallel to one another and to an imaginary diameter line of the tank cap, and the retaining lugs extend from the free ends of a slanted, projecting carrier affixed to an external circumferential surface of the filling pipe.

6. A closing apparatus in accord with claim 5, further including a position axle parallel to the pivot axle, the position axle including two ends which lie in a second set of pivot eyes disposed within the retaining lugs, the position axle being connected with a drive rod, wherein an imaginary connection line through the first and the second sets of pivot eyes of the retaining lugs together with the top surface of the tank cap form an acute angle a with the drive rod.

7. A closing apparatus in accord with claim 6, wherein the lock member is connected at its end to the position axle, wherein each of the pivot eyes within the second set of pivot eyes is an extending longitudinal slot for allowing the lock member to slide parallel to a direction of motion of the drive rod.

8. A closing apparatus in accord with claim 6, further including a pivot arm having a first end and a second end the first end of which is placed on the position axle and the second end of which is placed in a second pivot axle which runs parallel to the position axle, wherein the drive rod is pivotably attached to the second pivot axle.

9. A closing apparatus in accord with claim 1, wherein the tank cap possesses a cup shaped cap housing and an axially movable gasket for sealingly engaging a rim of the filling pipe, the top surface of the tank cap defining at least two pressure latches, the pressure latches laterally flanking the lock member and capable of working together with the lock member to press the gasket against the rim of the filling pipe.

10. A closing apparatus in accord with claim 9, wherein longitudinal slots are present in the pressure latches, the longitudinal slots defining with the top surface of the tank cap an acute angle $\beta$.

11. A closing apparatus in accord with claim 8, wherein the opening and closing movement of the tank cap is force-coupled with the opening and closing movement of a tank lid.

12. A closing apparatus in accord with claim 11, wherein the tank lid is secured with at least one arm of a two-armed pivot assembly which is pivotably attached to the vehicle and which is pivotably coupled with at least one connection rod to the pivot axle.

13. A closing apparatus in accord with claim 12, wherein the connection rod, on its end which is pivotably attached to the pivot arm of the tank lid, possesses an elongated hole extending substantially longitudinally in the connection rod, into which a lateral protruding coupling pin of the pivot arm extends.

14. A closing apparatus in accord with claim 12, wherein the the filling pipe includes a separately formed upper portion, which, together with the tank cap and the tank lid as well as lock member pivot axle position axle and two-armed pivot assembly may be pre-assembled.

15. A closing apparatus in accord with claim 1, wherein the drive element is a pneumatic, hydraulic or electric drive element.

16. A closing apparatus in accord with claim 15, wherein the drive element is a pneumatic cylinder.

17. A closing apparatus in accord with claim 16, wherein the pneumatic cylinder is double acting and activated by vacuum.

18. A closing apparatus in accord with claim 17, wherein control of the vacuum loading of the pneumatic cylinder is accomplished by a 4/3-way valve.

19. A closing apparatus in accord with claim 18, wherein the 4/3-way valve is solenoid operated.

20. A closing apparatus in accord with claim 15, further including a pneumatic or a hydraulic emergency hand-pump, insertable in the drive element to move the drive element in the opening direction.

* * * * *